3,498,922
METHOD OF DISPLACING LIQUID ORGANIC FILMS FROM SOLID SURFACES
William A. Zisman, Silver Spring, Md., and Marianne K. Bernett, Washington, D.C., assignors to the United States of America as represented by the Secretary of the Navy
No Drawing. Filed Oct. 18, 1966, Ser. No. 588,256
Int. Cl. C11d 7/26, 7/48
U.S. Cl. 252—171                                4 Claims

ABSTRACT OF THE DISCLOSURE

A method of displacing liquid organic films from solid surfaces by the application thereto of a nonaqueous liquid surface-active composition. The composition is a solution of a small amount of a high molecular weight linear dimethyl silicone (molecular weight 1200 to 15,000) in a low molecular weight silicone from the dimer through the octamer.

This invention described herein may be manufactured and used by or for the Government of the United States of America for governmental purposes without the payment of any royalties thereon or therefor.

This invention relates to a method for surface-chemical displacing of liquid organic films from solid surfaces. The term film as used herein means a layer of an organic liquid which is physically adsorbed to a solid surface.

The usual procedures presently employed for removing oily films from solid surfaces of electrical, electronic or mechanical equipment involves spraying the solid surface with a solvent for the oily material or with an aqueous emulsion which contains a volatile solvent, a penetrant oil and a surface-active agent and functions through surface-chemical activity to displace the oily film.

The solvent film-removing procedure is simply a solvent-washing of the solid surface and depends essentially on the solubility of the oily material in the solvent.

The aqueous emulsion film-removing procedure requires spraying of the emulsion to the solid surface whereby the emulsion is broken on contact with the surface to release the penetrant oil which, with the assistant of the surface-active agent in the water of the emulsion, causes displacement of the oily film from the solid surface. The displacement of the oily film is followed by washing of the solid surface with water to remove residues of the oily film and of the applied emulsion. Optionally, the water-washing step is followed by spraying of a water-displacing composition to remove water from the washed surface.

The above prior art procedures require repeated spraying and, resultingly, the use of large amounts of the solvent or of the aqueous emulsion, as the case may be, to achieve a practical degree of displacement of the oily film from the solid surface. The aqueous emulsion procedure, additionally, has the disadvantage of introducing water which would prove detrimental or injurious in the cleaning of electrical and electronic equipment containing parts which are damaged by water.

It is an object of the present invention to provide an improved surface chemical method of displacing liquid organic films from solid surfaces using nonaqueous liquid compositions.

The above and other objects are accomplished by the method of the present invention in which liquid organic films are displaced from solid surfaces by the application thereto of liquid surface-active compositions which are nonaqueous organic solutions of a solute in a volatile solvent in which the solvent, by virtue of its molecular constitution, is an active displacing agent. The liquid compositions are also effective for displacing films of physically adsorbed water from solid surfaces.

In the practice of the method of the invention, the liquid surface-active compositions may be applied by various procedures to the solid surfaces from which a liquid organic film is to be displaced, such as by spraying or flushing with the compositions or by dipping or immersing the surfaces in a bath of the compositions, with or without ultrasonic agitation. Sprayed onto the solid surfaces, relatively small volumes of the liquid compositions will effectively displace liquid organic films from the surfaces, for example, a few cubic centimeters per 100 square inches of surface area.

The method of the invention is effective to displace any liquid organic film from solid surfaces, for example, films of aliphatic and aromatic hydrocarbon oils, liquid fatty acids, liquid alcohols, liquid esters and ketones, etc., from surfaces of solids such as metals, glass, resins and polymers. Particular applications of the method are in the cleaning of oily films from solid surfaces of electrical equipment, such as electric motors, and electronic equipment.

In a single operation, the method displaces the liquid organic film from the solid surface and deposits thereon a composite monolayer of the solvent and solute which prevents respreading of the displaced organic liquid over the solid surface for short periods of time. The rate of displacement of the liquid organic film from the solid surface will depend on the active displacing solvent in the compositions and also on the organic liquid of the film to be displaced.

The volatile solvent for the liquid compositions used in the method of the invention is a low molecular weight dimethyl silicone, which may be a liquid linear, branched or cyclic dimethyl silicone from the dimer through the octamer and preferably is the trimer.

The solute for the liquid compositions used in the method of the invention is a high molecular weight linear dimethyl silicone, which may be a liquid dimethyl silicone having a molecular weight from about 1200 to 15,000 (viscosity grades from 10 centistrokes to 350 centistokes at 25° C.). The amount of this solute in the compositions may be varied. In general, amounts of this solute which are in the range of from about 4 to 7% by weight of the compositions will provide an adsorbed layer on the solid surface from which the liquid organic film has been displaced which will prevent respreading of the displaced organic liquid over the solid surface for periods of from about 30 minutes to several hours. The length of this period in general will be greater, the higher the molecular weight of this solute.

The volatile solvent in the liquid compositions serves as a convenient means to distribute the solute rapidly over the solid surface, aids actively in displacing the liquid organic film from the surface and evaporates leaving the surface oil-and-water-repellent.

The invention is further illustrated by the following specific examples of liquid surface-acting compositions which may be used in the method of the invention. Parts are by weight.

EXAMPLE 1

|  | Percent |
|---|---|
| Linear dimethyl silicone trimer | 95 |
| Linear dimethyl silicone, M.W. 1200 | 5 |

EXAMPLE 2

|  | Percent |
|---|---|
| Linear dimethyl silicone trimer | 95 |
| Linear dimethyl silicone, M.W. 15,000 | 5 |

The method of the invention can be used for displacing liquid organic films from solid surfaces with provision of long to indefinite periods of prevention of respreading of the displaced organic liquid over the solid surface by employing surface-active compositions as described above which are modified to contain a small amount of an additional solute, about 0.1% by weight or less of the compositions, which is a polar-nonpolar long-chain saturated aliphatic compound which adsorbs to the solid surface to provide a durable oleophobic protective coating thereon. Compounds of this kind, as an additional solute in the liquid compositions, are fatty acids of the formula $CH_3(CH_2)_nCOOH$, fatty amines of the formula $CH_3(CH_2)_nNH_2$ and fatty acid amides of the formula $CH_3(CH_2)_nCONH_2$, wherein $n$ is an integer from 12 to 30. These compounds may be expressed by the general formula:

$$CH_3(CH_2)_nR$$

wherein R is the —COOH, —NH$_2$ or —CONH$_2$ group and include, for example, myristic, palmitic, stearic, arachidic and melissic acids, etc.; palmityl-, stearyl- and arachidyl amines and the corresponding amides, etc.

The following specific examples are illustrative of the modified surface-active compositions which may be used in the method of the invention. Parts are by weight.

EXAMPLE 3

| | Percent |
|---|---|
| Linear dimethyl silicone trimer | 95 |
| Linear dimethyl silicone, M.W. 1200 | 4.95 |
| Stearic acid | 0.05 |

EXAMPLE 4

| | |
|---|---|
| Linear dimethyl silicone trimer | 95 |
| Linear dimethyl silicone, M.W. 1200 | 4.95 |
| Stearamide | 0.05 |

Since the monolayers deposited by the liquid compositions in the application of the method are hydrophobic and oleophobic, the compositions can be applied as abhesives, e.g., mold-release agents. The deposited monolayers are effective in preventing or inhibiting subsequent corrosion of steel by the humid atmosphere.

While the invention has been described herein with reference to certain specific embodiments thereof, these are intended by way of illustration and not in limitation except as may be defined in the appended claims.

What is claimed and desired to be secured by Letters Patent of the United States is:

1. A method of displacing liquid organic films from solid surfaces which comprises applying thereto a non-aqueous liquid surface-active composition consisting essentially of a solution of a small amount, from about 4 to 7% by weight, of a high molecular weight linear dimethyl silicone having a molecular weight of from about 1200 to 15,000 in a low molecular weight dimethyl silicone selected from the group consisting of liquid linear, branched and cyclic dimethyl silicones from the dimer through the octamer.

2. A method as defined in claim 1, wherein the low molecular weight linear dimethyl silicone is the trimer.

3. A method as defined in claim 1, wherein the non-aqueous liquid surface-active composition additionally contains in solution a small amount up to about 0.1% by weight of a long-chain oleophobic compound of the formula:

$$CH_3(CH_2)_nR$$

wherein R is a member of the group consisting of —COOH, —NH$_2$ and —CONH$_2$ radicals and $n$ is an integer from 12 to 30.

4. A method as defined in claim 3, wherein the long-chain oleophobic compound is stearic acid.

References Cited

UNITED STATES PATENTS

| 2,439,856 | 4/1948 | McGregor et al. | 260—448.2 |
| 2,491,843 | 12/1949 | Wilcock | 260—448.2 |
| 2,955,047 | 10/1960 | Terry | 252—171 |
| 3,196,027 | 7/1965 | White et al. | |

OTHER REFERENCES

Carrie et al.: "Silicones," New Cosmetic Vehicles, Dow Corning Coop. (1954).

Rochow: Chemistry of the Silicones (1951), John Wiley & Sons Inc., pp. 1 and 88.

RICHARD D. LOVERING, Primary Examiner

W. SCHULZ, Assistant Examiner

U.S. Cl. X.R.

106—287, 311; 134—40; 252—364, 396